Figure 1:
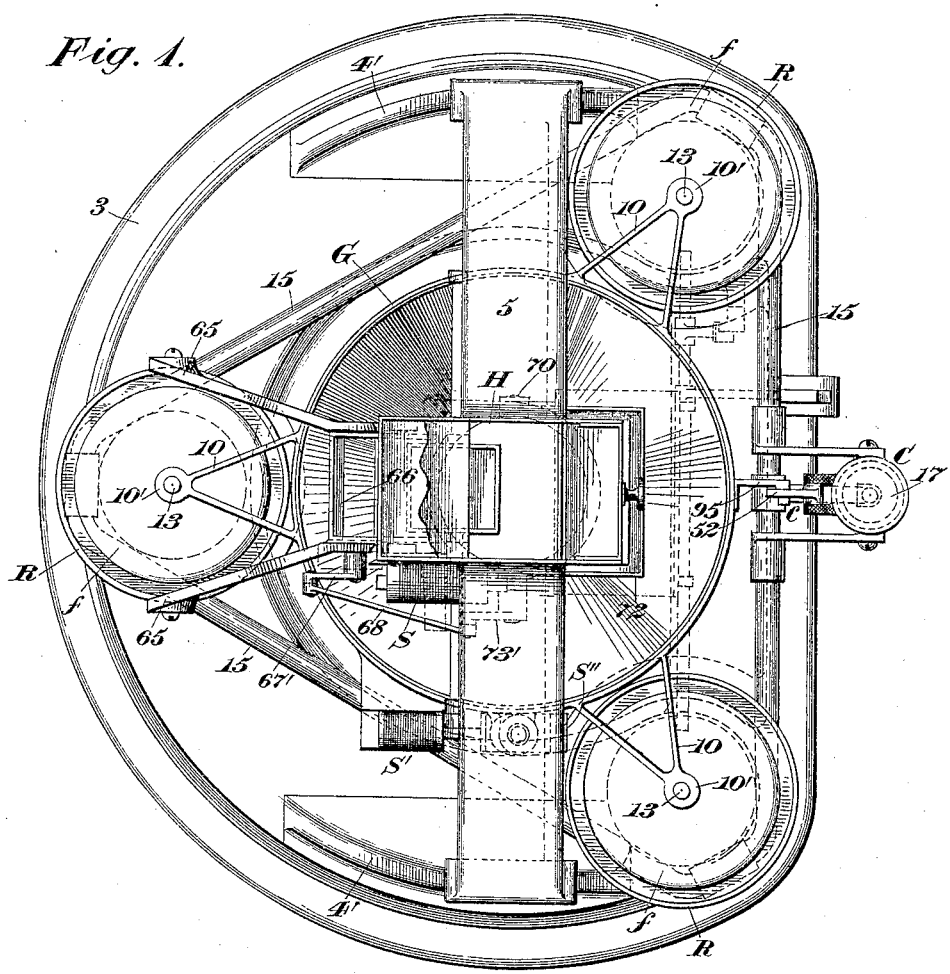

No. 607,465. Patented July 19, 1898.
F. H. RICHARDS.
WEIGHING MACHINE.
(Application filed Oct. 27, 1897.)
(No Model.) 6 Sheets—Sheet 1.

Witnesses:
Chas. F. Schmelz
Fred. J. Dole.

Inventor:
F. H. Richards

No. 607,465. Patented July 19, 1898.
F. H. RICHARDS.
WEIGHING MACHINE.
(Application filed Oct. 27, 1897.)
(No Model.)
6 Sheets—Sheet 3.

Witnesses:
Chas. F. Schmelz
Fred. J. Dole.

Inventor:
F. H. Richards

No. 607,465. Patented July 19, 1898.
F. H. RICHARDS.
WEIGHING MACHINE.
(Application filed Oct. 27, 1897.)
(No Model.) 6 Sheets—Sheet 5.

Witnesses:
Chas. F. Schmelz
Fred. J. Dole.

Inventor:
F. H. Richards.

No. 607,465. Patented July 19, 1898.
F. H. RICHARDS.
WEIGHING MACHINE.
(Application filed Oct. 27, 1897.)
(No Model.) 6 Sheets—Sheet 6.

Witnesses:

Inventor:

United States Patent Office.

FRANCIS H. RICHARDS, OF HARTFORD, CONNECTICUT.

WEIGHING-MACHINE.

SPECIFICATION forming part of Letters Patent No. 607,465, dated July 19, 1898.

Application filed October 27, 1897. Serial No. 656,560. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to improvements in automatic weighing-machines adapted for weighing predetermined quantities of material; and it has for its main object the provision of an improved hydraulic or hydrostatic weighing-machine in which the operations of the more important members of the mechanism will be controlled, primarily, by hydraulic action due to variations in the displacement of the supporting fluid, by means of which the load-receiver of the machine is sustained.

One of the principal features of my present improvements is the provision of a machine of this type in which the load-receiver is supported directly on and preferably moves in unison with hydraulically-balanced supporting means, which in the improved construction may be disposed entirely without the periphery of and inclose the load-receiver in such a manner that the latter will not be supported at any point directly by the fluid, but will be freely suspended, so as to be capable of operation in substantially the same manner as load-receivers supported by beam mechanisms in the ordinary type of weighing-machines of this class. Usually the load-receiver, which will of course be vertically movable, will have a load-discharger or closer controlling the discharge of each completed load, which discharger or closer may be located advantageously at or near the bottom of the bucket and entirely clear of the hydraulically-balanced supporting means by which the load-receiver is upheld, and in order to enable the load-receiver and the load-discharger to operate properly I prefer to employ a plurality of hydraulically-balanced supporting devices disposed in a circuit around the load-receiver and located, preferably, equidistant from each other and from the center of the load-receiver and at a considerable distance above the lower or discharging end of the receiver. By disposing the several receiver-supporting devices in the manner just stated the receiver will be balanced equally at all points in the periphery thereof and will rise and fall with a vertical movement.

The vertical movements of the load-receiver, as it is counterpoised or overpoised, may be employed to control the operations of the several principal mechanisms of the weighing-machine—as, for example, the operation of suitable stream-controlling means and the load-discharger—and in this case as the load-receiver is hydraulically balanced the movements of the load-receiver may be transmitted conveniently by hydraulic pressure to suitable controlling means governing the operation of these parts.

My present improvements are especially designed and intended for use in connection with a machine of the "overloading" type, shown in prior patents granted to me and in which the load-receiver, after being overpoised, is brought to the poising-line by the removal of the overload, either at a single operation or by several successive operations of suitable load-reducing and auxiliary load-supplying means. Hence an important feature of these improvements is the employment of hydraulically-operated controlling means for governing the operation of an overloading-machine embodying such load-reducing and auxiliary load-supplying means, this controlling means preferably governing the operation of said load-reducing means and auxiliary load-supplying means through the medium of suitable electric controlling devices.

It will be noticed at this point that in the preferred construction the movements of the load-receiver in a vertical direction are transmitted directly by hydraulic pressure to a suitable controller or controlling means, which in turn will govern the operation of electrical devices for effecting the operation of one or more of the principal mechanisms of the weighing-machine and especially the operation of the stream-controlling means or valve mechanism and the load-discharger carried by the receiver. Hence I make use of combined hydraulic and electrical controlling devices in which the operation of the electrically-controlled parts is dependent upon the action of a hydraulically-operated member or members movable in accordance with and proportionally to variations in the displacement of the fluid by which the load-receiver is sustained.

Other features of these improvements relate to a novel form of load-discharger and means for supporting it, to holding means for securing the load-discharger in its open position and controlling it as to its return to its closed position by electrically-operated means governed by the return of the regulator to the normal position of the latter, to the construction of the load-reducing means, and to certain other details which will be described more fully hereinafter.

Figure 2:
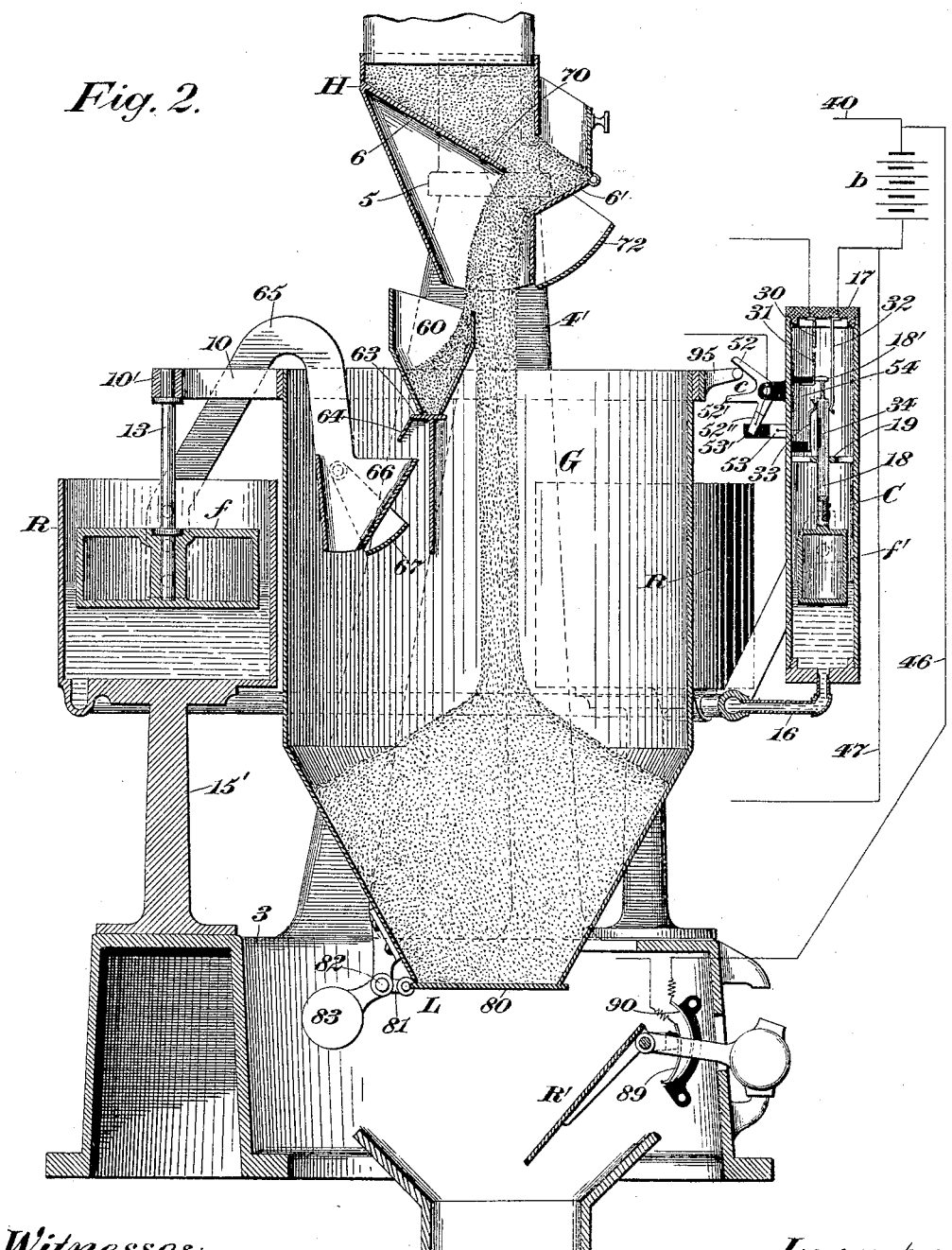
Figure 3:
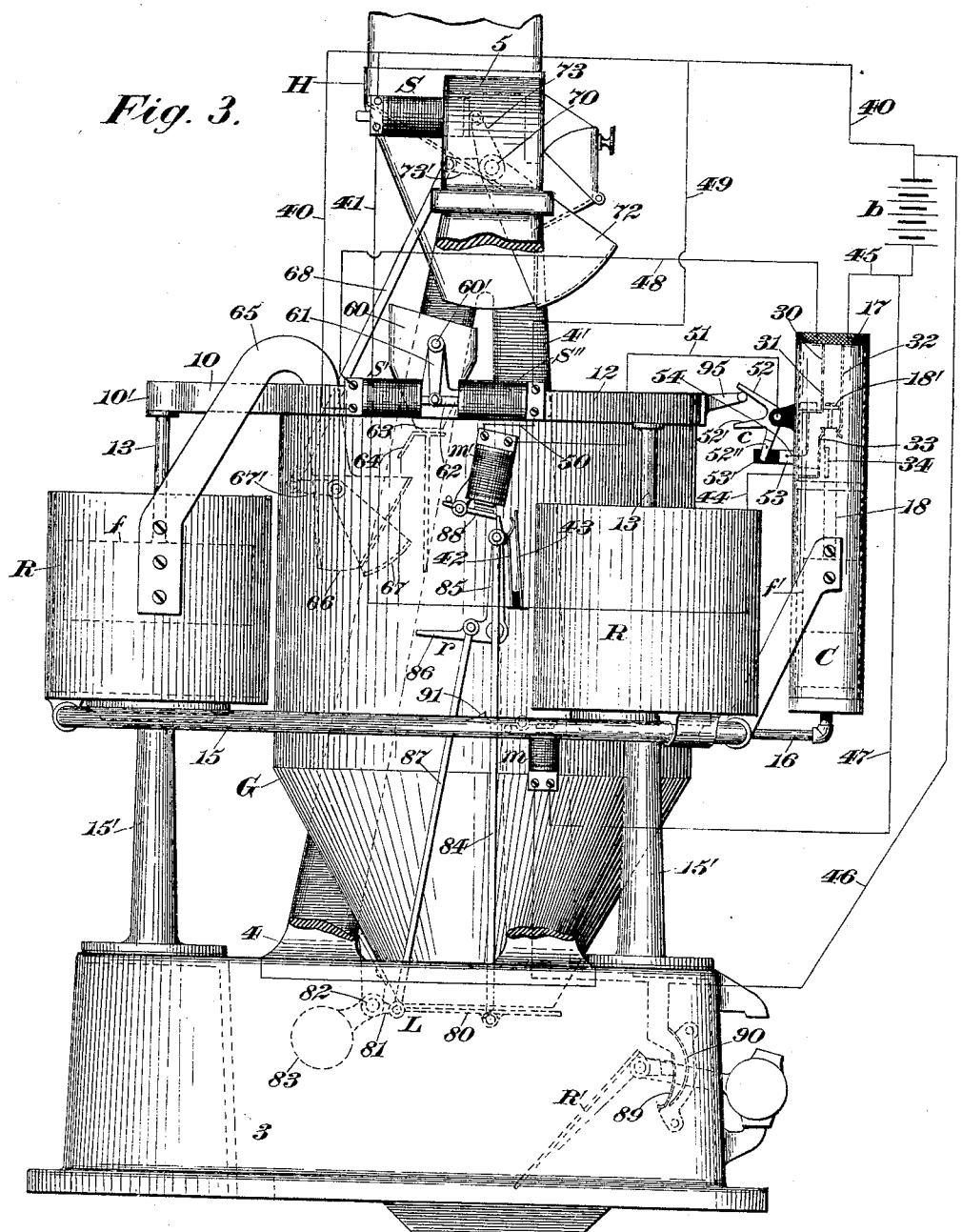
Figure 4:
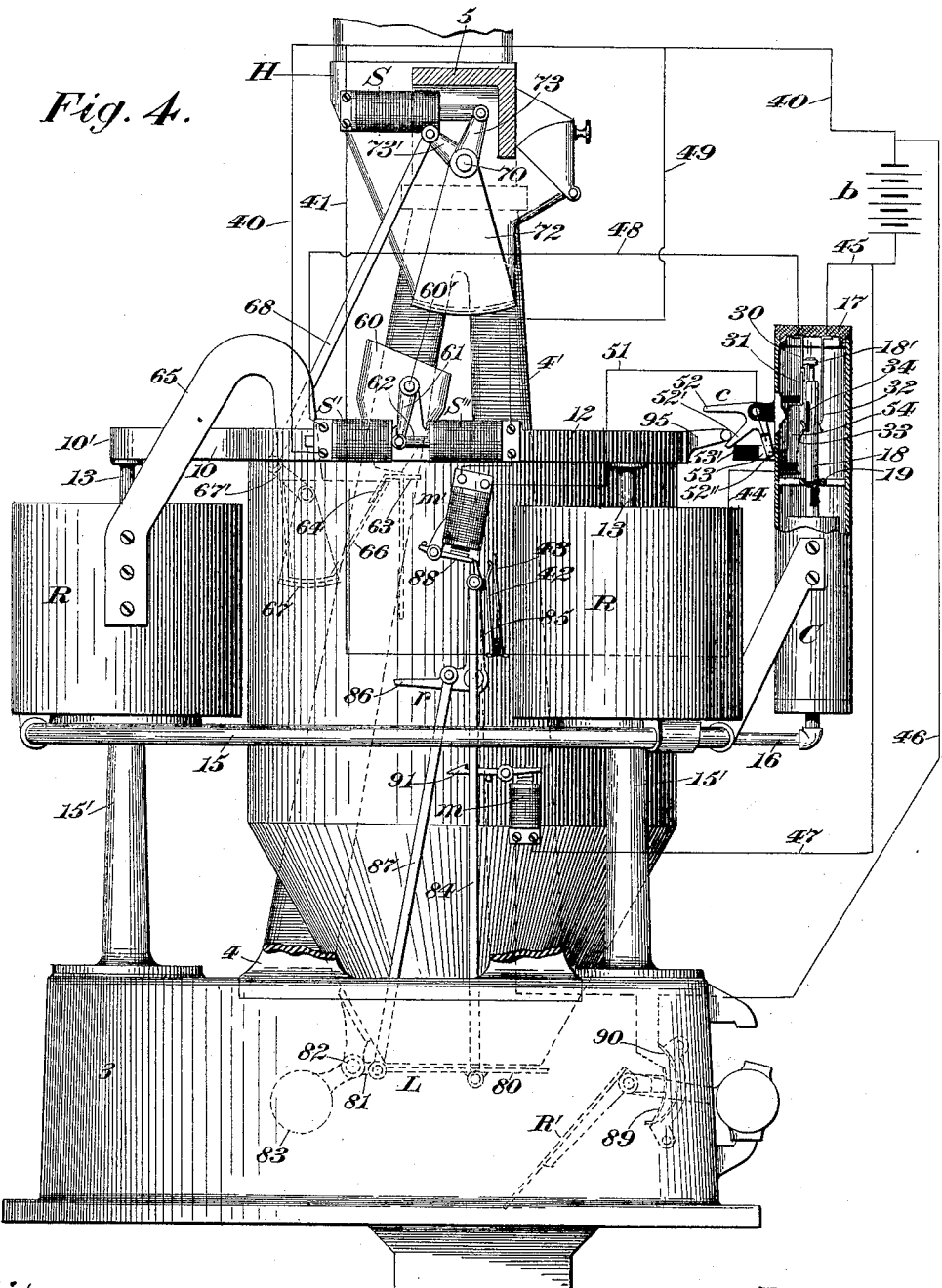
Figure 5:
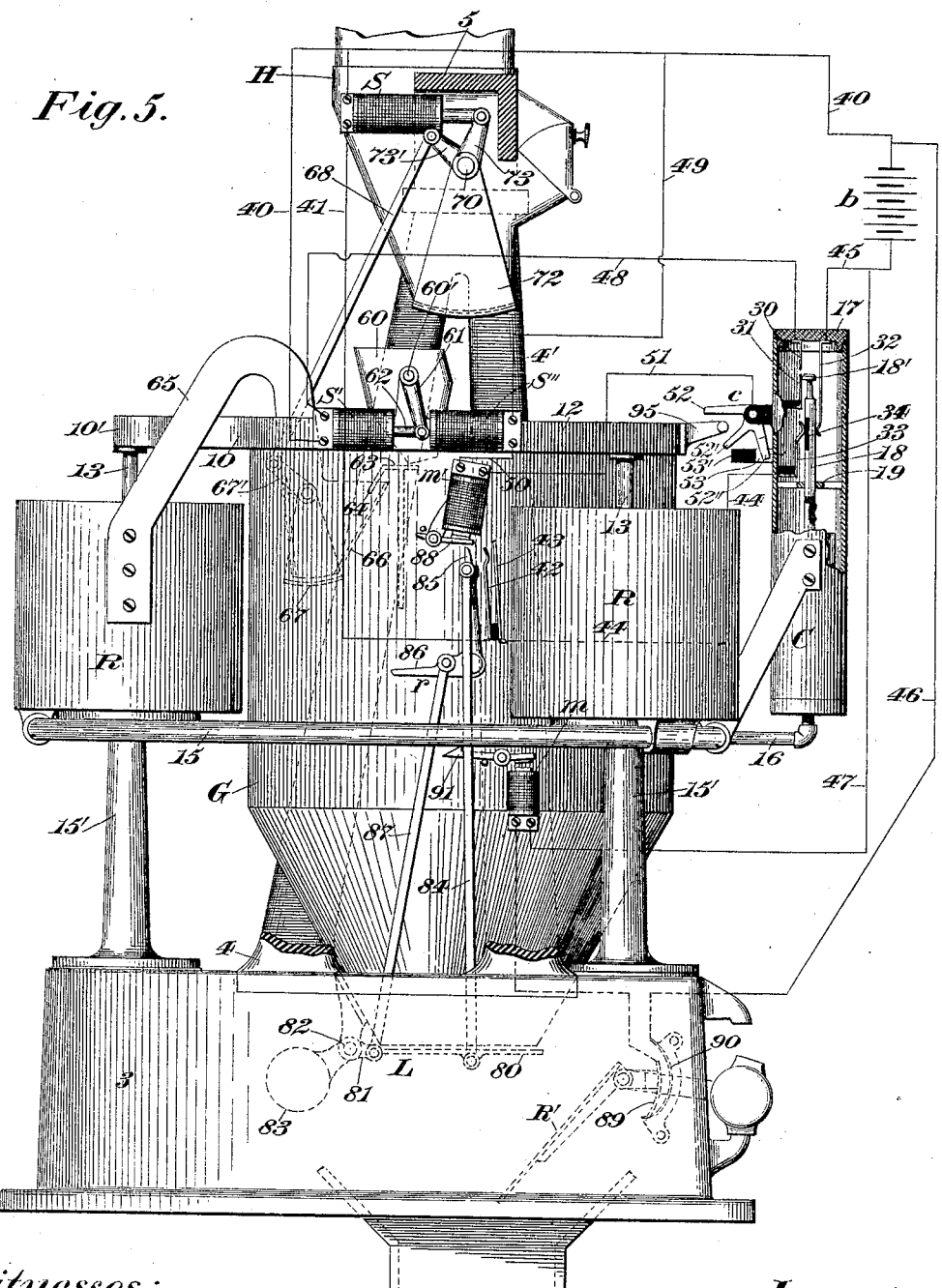
Figure 6:
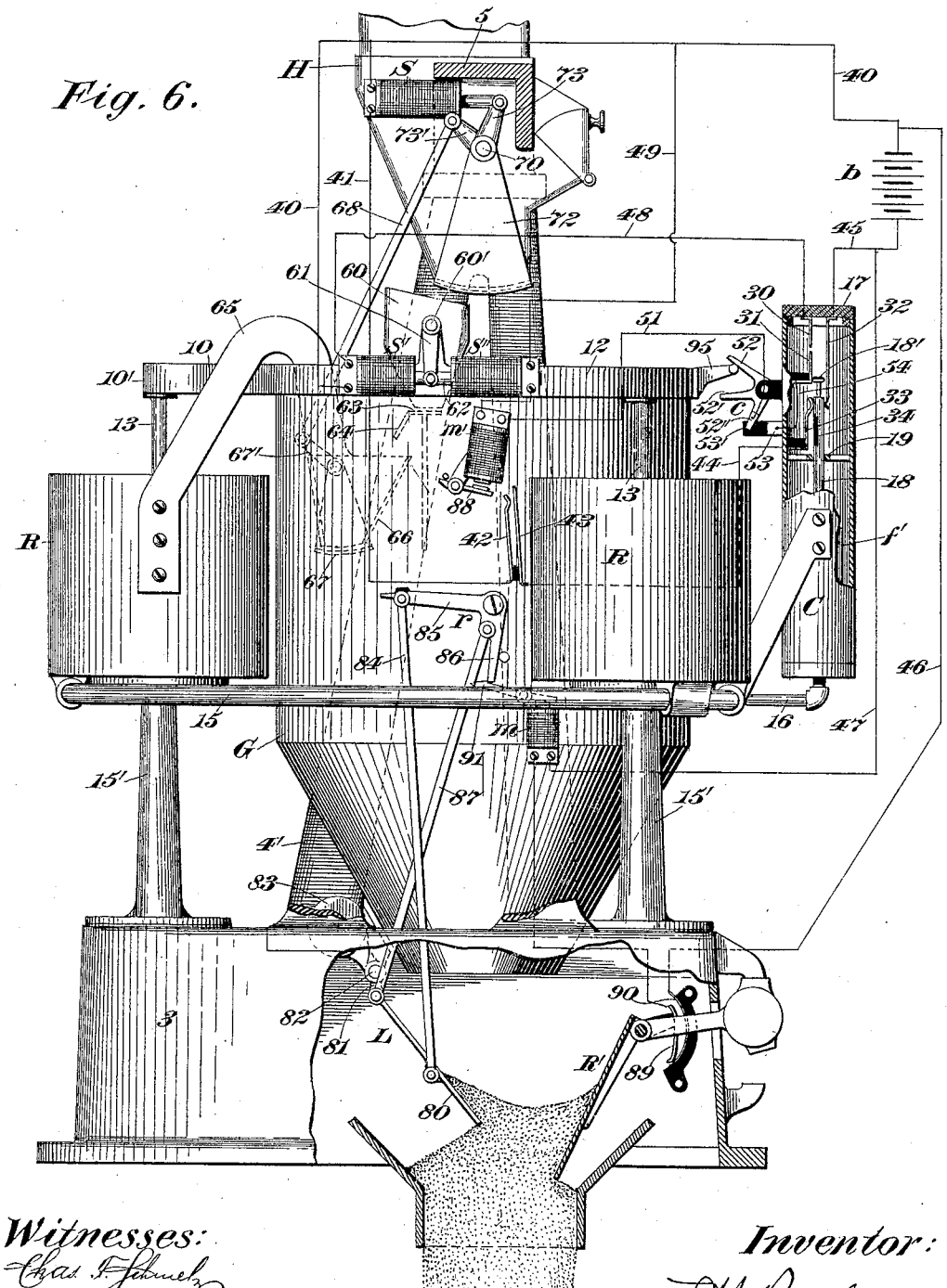

In the drawings accompanying and forming part of this specification, Figure 1 is a plan of a hydraulic weighing-machine embodying my present improvements. Fig. 2 is a central vertical section of the same and a portion of the electrical connections therefor, illustrating the positions of the parts at the beginning of a cycle of movements. Fig. 3 is a side elevation of the same with parts broken away, showing all of the electrical connections and illustrating the parts in the same positions as in Fig. 2. Fig. 4 is a view similar to Fig. 3, illustrating the positions of the parts on the overloading of the load-receiver. Fig. 5 is a similar view showing the positions of the parts on the reduction of the overload in the receiver and the rising of the latter, and Fig. 6 is a similar view illustrating the positions of the parts after the discharge of the completed load.

Similar characters designate like parts in all the figures of the drawings.

Any suitable framework may be employed for carrying the hydraulically-balanced supporting means on which the load-receiver and other parts of my improved weighing-machine are mounted and for carrying directly the other parts of the apparatus which are not movable with the load-receiver. A framework suitable for this purpose is illustrated in the drawings, the construction shown comprising a hollow supporting-base, such as 3, from which rise side frames, such as 4 and 4′, which may be connected at their upper ends by means of a cross-beam 5, carrying the usual stream-supplying means or hopper, such as H.

The hopper H may be of any suitable type, but will have, preferably, a pair of stream-deflectors, such as 6 and 6′, for breaking the force of the stream directed against the valve, by means of which the flow of material is controlled.

Any suitable stream-supplying means or valve mechanism may be employed for regulating the flow of this stream; but I prefer to make use of some simple form of valve—such, for instance, as that shown at 72, supported by the top beam 5, the axis of movement of the valve being indicated by 70. This valve may be operated in any suitable manner, and in this instance it has projecting therefrom a rock-arm 73, suitably connected with the core of a solenoid, such as S, by means of which the valve is intended to be operated, the valve opening when the solenoid is energized and closing in any suitable way, either by reason of its own weight or by means of a proper core-projecting spring. (Not shown.) The load-receiver which I employ may be of any suitable type, such as that illustrated herein at G. This load-receiver will be vertically movable and will be carried directly on suitable hydraulically-balanced supporting means, so as to move in unison with the latter. In the present case the load-receiver is in the form of a bucket substantially circular in cross-section, having projecting from the outer walls thereof a plurality of arms, such as 10, three of which are illustrated herein, equidistant from each other and connected to a ring or annulus, such as 12, encircling the load-receiver and secured thereto. At the outer end thereof each of the arms 10 has a bearing member, such as 10′, vertically bored for the reception of a suitable plunger or rod adapted to carry at the lower end thereof a support or float for balancing the load-receiver on a proper fluid, although, of course, this particular construction need not necessarily be adhered to, it being only necessary that the load-receiver be mounted on suitably-balanced supports or floats.

The hangers or plungers, which are carried in the bores of the members 10′, are designated herein by 13, and each connects at its lower end with a load-receiver-supporting float, such as f, preferably hollow and having usually a circular periphery. Each of these floats may be mounted in a suitable fluid-containing vessel or chamber, such as the chambers shown at R, each of these chambers being preferably supported on a standard or column, rising from the base 3 of the machine. The floats f will usually be supported on mercury, with which the chambers R may be filled to the proper height. It will be noticed that these chambers and the floats are not only disposed equidistant from one another in the construction shown, but also equidistant from the center of the load-receiver, as will be obvious by referring to Fig. 1. Hence the weight of any load in the load-receiver and the pressure exerted thereby on the fluid in the chambers R will be borne equally by the floats f, and the load-receiver will rise and fall evenly and in a vertical direction when loaded.

Preferably all of the fluid-chambers R are connected at their lower ends by means of suitable conduits or pipes, such as shown herein at 15, so that any pressure exerted in any one of the chambers R will be transmitted equally to each of the others of said chambers.

As the three chambers R and the pipes 15 are all in communication with one another, it will be obvious that a branch pipe connected with one of the conduits or pipes 15 will be capable of transmitting to suitable controlling means the pressure exerted in the respective chambers and pipes R and 15 and that any variations in the pressure of such fluid due to the variable quantity of fluid displaced by the floats $f$ on the rising and falling of the load-receiver may be transmitted through such branch pipe to a suitable chamber containing controlling means for governing the operation of one or more of the principal movable devices or mechanisms of this improved machine. Such a branch pipe is indicated herein at 16, and this branch pipe may connect with the lower end of a suitable controlling or pressure-balancing chamber (designated herein in a general way by C) which may be of any suitable height and cross-section. This chamber may advantageously be in the form of a narrow cylinder closed at its lower end and preferably sealed at its upper end by means of a cap, such as 17, which, for reasons which will be hereinafter more particularly referred to, may be of insulating material. It will be noticed that when this cap is secured in place the chamber C is sealed and contains above the fluid or mercury forced thereinto from the chambers R and the pipes a body of air, which, in connection with the mercury, constitutes a means for governing the movements of a suitable controlling device and for balancing the movements of the latter to prevent an undue range of movement of the latter and undesirable rapidity of action. Hence when the pressure of the load-receiver is transmitted by means of the floats $f$ of relatively large cross-sectional area to a controlling device supported on the mercury in the chamber C and of relatively small cross-sectional area the latter will not have an unduly rapid movement imparted thereto if the cylinder is sealed at its upper end in the manner just specified, as the greater the pressure exerted by the mercury the greater will be the compression of the air in the upper part of the cylinder C, and hence the greater the resistance to the continued rise of the mercury or other fluid.

As hereinbefore stated, I prefer to make use of the variations in the displacement of the fluid or mercury due to the rising and falling of the load-receiver as a means for governing the movements of a suitable hydraulically-operated controller, which in turn will control the action of electrical devices for operating one or more of the principal mechanisms of the machine. In this case I have illustrated a single controller or controlling means, although, of course, this is not essential, said controller being in the present instance in the form of a float—such, for instance, as that shown herein at $f'$—vertically movable in the chamber C and having preferably a plunger or rod—such, for instance, as that shown herein at 18—rising therefrom and guided advantageously in its vertical movements, as by means of a guide 19 within the chamber C. It will be apparent that the movements of this vertically-reciprocatory plunger may be employed as a means for opening and closing in a predetermined order and at the proper time, which, of course, will be determined entirely by the variations in the displacement of the mercury, one or more electric circuits controlling the operations of any of the devices of the weighing-machine the movements of which it may be desired to control electrically. Hence this plunger 18 constitutes the movable member of electrical circuit-controlling means, said rod being in this instance an automatic electrical circuit-controller or circuit maker and breaker governing the opening and closing of three distinct and parallel circuits, one of which includes the solenoid S for operating the stream-controlling valve 72, while the other two circuits control, preferably by means of a pair of solenoids, the opposite movements of suitable load-reducing means for reducing the overload and for restoring its contents to the main load-receiver on the making up of a true load, one of said last-mentioned circuits also preferably controlling the release of the shiftable member of the weighing-machine, by means of which shiftable member the discharge of the load is effected. Another circuit, which may be connected also in parallelism with a common source of electric energy, may control the operation of a suitable electrically-operated holding device or latch for holding or latching the shiftable member or load-discharger of the weighing-machine in its open position on the efflux of the contents of the load-receiver therefrom and until the return of a suitable regulator to its normal, idle, or non-regulating position.

At its upper end the plunger 18 has a head connected to the body portion of the plunger—in this instance by means of a reduced shank—and this head, which is indicated herein by 18′, is of somewhat greater diameter than the diameter of the body portion of the plunger for the purpose of enabling said head to coöperate with one or more contacts included in a corresponding circuit or circuits and for enabling the body portion of the plunger to coöperate with another contact or contacts. The two electrical contacts with which the head 18′ is intended to engage may be of any suitable type, and are indicated herein at 30 and 31. The contact 30 is carried by the cap 17, which, as before stated, is of insulating material, and hence the said cap serves as a means for insulating this contact and another one from the metallic parts of the hydraulically-operated controlling device. The contact 31 may be carried by and insulated from the inner side of the chamber C, and its contact-face is preferably in alinement with but separated from that of the contact 30. The other pair of contacts with which the body of the plunger 18 will coöperate may also be of any suitable construction—such, for instance, as the contact members shown at 32 and 33. The contact 32 is carried by the insulating-cap 17, while the contact 33 is in the form of an arm insulated from the inner side of the casing C. For the purpose of breaking the circuit with the contact 33 at the proper time the plunger 18 may have thereon a strip of insulating material, such as that shown at 34, on which the contact 33 may lie when the float $f'$ is forced upward by the pressure of the fluid on the descent of the load-receiver.

All of the contacts just described are connected in suitable circuits with a proper source of electrical energy—such, for example, as the battery shown at $b$. One of the circuits of this battery is through a conductor, such as 40, to the solenoid S, through conductor 41 to an electrical circuit-controller governed by the movements of the shiftable member or load-discharger of the weighing mechanism, this circuit-controller comprising a pair of insulated contact-arms, such as 42 and 43, the latter of which is connected by means of a conductor 44 with the contact member 33, the circuit being completed through the circuit-controlling plunger 18, contact-arm 32, and conductor 45. Another circuit from said battery may control the latching open of a load-discharger in the manner hereinbefore stated, a conductor being shown at 46, passing to an electromagnet $m$, controlling the movements of the holding device or latch for such load-discharger, the return-circuit being through conductors 47 and 45. Still another circuit from the battery $b$ is by way of conductor 40 to a solenoid S', by means of which the load-reducing member or spout hereinbefore referred to is actuated in one direction, the return-circuit from the solenoid being by way of conductor 48 to contact-arm 30, and, when the plunger 18 is up, through the head 18' of said plunger to contact-arm 32, and back to the battery by way of conductor 45. The other solenoid, to which reference has already been made and by means of which said load-reducing member or spout is intended to be actuated in the opposite direction to that in which it is shifted by means of the solenoid S', is indicated herein at S'' and is included in a circuit from the battery $b$, it being connected thereto by conductors 40 and 49, said circuit also including in this instance an electromagnet $m'$, connected with the solenoid S'' by means of a conductor 50, the electromagnet $m'$ being in turn connected by means of a conductor 51 with a circuit-controller, such as $c$, which may be mounted in any suitable manner and will have a contact-arm 52'' insulated from the main portion of the circuit-controller and coöperative with a contact member 53, connected by means of a conductor 54 with the contact-arm 31 within the chamber or casing C, the head 18' of the plunger 18 being adapted to complete the circuit by way of contact-arm 32 and conductor 45.

As before stated, the machine illustrated in the drawings of the present application is of the overloading type—that is to say, it is one in which an excessive load is supplied to the load-receiver in the first instance by the supply-spout H, and afterward this overload is reduced by the action of a suitable load-reducing member or spout. The load-reducing means which I prefer to employ may be in the form of a spout carried on the load-receiver, preferably near the upper or receiving end thereof and in position to have a portion of the supply-stream flow thereinto during the making up of a load in the main load-receiver. The load-reducing spout which I prefer to employ is indicated herein at 60 and is mounted for oscillation in any suitable manner on the upper side of the load-receiver G, its axis of movement being indicated herein by 60', and for the purpose of operating the spout to shift it to either side of the normal central position I have shown herein the rock-arm 61, pivotally connected to a core 62, common to the two solenoids S' and S'', so that the load-reducing spout may be oscillated to one side or the other as the one or the other of the solenoids is energized. This load-reducing spout may be returned to its normal central position in any suitable way, it being usually of sufficient weight to return to such position without employing extraneous actuating means.

In connection with the load-reducing spout I prefer to employ a fixed cut-off plate for controlling the discharge end thereof, and such a plate is shown herein and is carried by the bucket in such a position as to close the discharge end of the load-reducing spout when the latter is in its central position. The cut-off member of this plate is indicated herein by 63, and in connection therewith there is shown a surplus-deflecting plate 64, inclined toward a suitable surplus-receiver for the purpose of permitting the excess of material in the spout 60 to be delivered into such surplus-receiver. When the load-reducing spout is oscillated in the opposite direction, the material contained therein will of course flow into the load-receiver G and be discharged with and as a part of the completed load.

The surplus-receiver which I prefer to employ will be mounted on some suitable fixed support forming part of the framework—as, for instance, between a pair of overreaching arms or hangers 65, secured to one of the chambers R. This surplus-receiver embodies in the construction shown two main elements, one a fixed spout having its receiving end adjacent to the surplus-deflecting plate 64 and having a reduced discharge end controlled by the second main member of said surplus-receiver, which second member is in the form of a valve, such as 67, adapted to close the discharge end of the spout 66. Preferably the valve 72 of the main load-supplying or overloading means will be connected with the valve 67 of the surplus-receiver, so that the two valves will move in unison, closing simultaneously and also opening at the same time. The connection shown herein is formed by means of a connecting-rod, such as 68, pivotally secured to rock-arms 73' and 67', movable, respectively, with the valves 72 and 67. It will be noticed that the two members 66 and 67 constitute not merely a surplus-receiver, but also a surplus-reconveying device, which will deliver its contents into the load-receiver G on the opening of the main valve 72 for the making up of each new load.

One of the important features of this invention is an improved load-discharger so constructed and so organized with respect to the coöperative parts of the weighing mechanism as to be capable of movement adjacent to that end thereof which is connected to a support, such as the load-receiver, before it begins to move at the free end thereof. Hence I have illustrated herein a closer (designated in a general way by L) counterweighted and made up of two main parts, one carried by the other and having parallel axes of movement. In the construction illustrated the closer proper, which is indicated at 80, is pivotally supported by rock-arms, such as 81, carried by a rock-shaft, such as 82, having a counterweight 83 at the side thereof opposite the rock-arms 81, these parts just described constituting a rock-frame having one axis of oscillation and supporting the closer proper, so that the latter, while movable therewith, will also be capable of oscillation relatively thereto about an axis parallel to the axis of the rock-shaft 82.

As is usual in machines of this class, as shown in prior patents granted to me, the load-discharger or closer is intended to be connected with a suitable rocker, such as $r$, pivoted on the side of the load-receiver or bucket G in such a manner that the connector or connecting-rod and the rocker will be substantially on the dead-center when the closer is shut. A connector or connecting-rod suitable for this purpose and operating substantially in this manner is shown herein at 84 and joins the closer proper, 80, near the free end thereof, to one arm, such as 85, of the rocker $r$, which may be of any suitable construction, but has herein two arms 85 and 86, to the latter of which another connector or rod, such as 87, is intended to be pivoted at its upper end, while the lower end of said connector or rod is pivoted to the load-discharger or closer, near the axis of oscillation of the latter. It will be seen, therefore, by referring to the drawings that between the rocker and the load-discharger are two connectors in the form of connecting-rods joined to the load-discharger or closer at different distances from one axis of oscillation of the latter and to the rocker in different angular positions with respect to the axis of the latter and also at different distances from such last-mentioned axis. Hence it will be clear that while the rod 84 will remain on the dead-center so long as the rocker is engaged by a suitable latch or holding device, yet when such latch is released the weight of the superimposed load pressing upon the load-discharger at a point near the connection of the closer-plate 80 with the rock-arms 81 will exert such a pull upon the rod 87 as to cause the latter to oscillate the rocker $r$ and strike the toggle before the closer-plate 80 begins to move at the free end thereof. Preferably the connecting-rod 87 will be pivoted to the rocker in such a manner as to exert its maximum leverage at the moment the closer begins to open, and it will be seen that this opening movement will be a compound one made up of the movement of the load-discharger as a whole about the axis 82 and the movement of the closer-plate 80 relatively to the other parts of the load-discharger and about an independent axis of oscillation on the rock-frame.

The latch which will be employed for holding the load-discharger in its closed position may be of any suitable type, but I prefer to make use of the swinging armature 88 of the electromagnet $m'$ for this purpose, said armature coöperating with the arm 85 of the rocker $r$ and serving as a detent to hold the latter until the electromagnet is energized.

For the purpose of preventing the premature closing of the load-discharger and consequent premature opening of the main valve 72 said load-discharger is preferably controlled as to its shutting by means of a regulator, such as R', which may be mounted within the base 3 of the machine in any suitable way and will be counterweighted substantially in the usual manner. This regulator will control the operation of a suitable electrical circuit-controller, the movable member of which is designated herein by 89 and may be carried on and insulated from the regulator, while the fixed member (designated by 90) may be supported by the base 3. This circuit-controller is intended to govern the operation of an electrically-operated holding device or latch, by means of which the load-discharger L will be held in its open position after the discharge of a load and until all of the material shall have passed by the regulator. Preferably the armature of the electromagnet $m$ has at one end thereof a holding device or latch, such as 91, which constitutes the means for securing the load-discharger in its open position, this latch preferably coöperating with the arm 86 of the rocker $r$ to engage the outer end of said arm as soon as the closer is opened wide.

The operation of an automatic weighing-machine constructed in accordance with my present improvements, as embodied in the construction illustrated in the drawings of this application, is as follows: It being understood that all of the operating devices are in their normal positions, with the main valve open and delivering material into the load-receiver, the load-reducing spout in its central position, the surplus-receiver open, the load-discharger closed, the regulator in its idle position, and all of the other parts in the positions shown in Figs. 2 and 3, it will be seen that the valve 72 is in this open position owing to the energization of the solenoid S by the passage of current through the circuit hereinbefore described, which circuit is controlled by the engagement of the contact portion of the plunger 18 with the contact-arm 33 and by the engagement of the two contact-arms 42 and 43, the movable arm 42 of which is operated by the arm 85 of the rocker $r$.

Part of the stream of material delivered from the supply-spout H flows into the load-reducing spout, as will be evident by referring to Fig. 2; but the major portion of the material is delivered directly into the load-receiver G, which as soon as it receives an overload descends below the poising-line thereof to the position shown in Fig. 4, whereupon the pressure of the displaced fluid in the chambers R is transmitted through the connecting-pipes to the casing C and the float $f''$ is raised to the point shown in Fig. 4, the air-pressure above said float serving as a check to retard the movement of this float and its plunger to the proper extent. On the rising of this float the contact-arm 33 rides onto an insulated portion 34 of the plunger-rod 18 and breaks the circuit to the solenoid S, whereupon the valve 72 at once closes and with it the valve 67 of the surplus-receiver. On the descent of the load-receiver to its overpoised position the circuit-controller $c$ is shifted in some suitable manner—as, for example, by the striking of an actuating-arm 95 on the load-receiver against the arm $52'$ of the circuit-controller and the consequent shifting of the contact member $52''$ off from the insulation $53'$ and onto the contact-terminal 53. Immediately thereafter, on the rising of the plunger 18 and the breaking of the circuit at 33, as just described, the head $18'$ of the plunger 18 makes circuit with the contact-arm 30, whereupon the circuit previously described for the solenoid S' will be closed to energize the latter and oscillate the load-reducing spout 60 to the left, as seen in Fig. 4, whereupon such spout will discharge a portion of its contents down the inclined stream-deflecting plate 64 into the surplus-receiver 66. As soon as a sufficient portion of the material in the load-reducing spout 60 has been delivered into the surplus-receiver the load-receiver G will rise to the poising-line and with it the floats $f$, whereupon the float $f'$ will fall, and the circuit at 30 will be broken by the descent of the plunger 18, a new circuit being made by the contact of the head $18'$ with contact-arm 31 when the load-receiver reaches the poising-line. On the making of this contact at 31 a circuit is immediately completed through the solenoid $S''$ and also through the electromagnet $m'$, as hereinbefore described, and the energization of these devices causes the shifting of the load-reducing spout 60 to the right, as shown in Fig. 5, and the release of the closer-latching armature 88 from the arm 85 of the rocker $r$. On the shifting of said load-reducing spout, as just described, the material therein is immediately discharged into the main bucket, to be delivered from the latter as part of the completed load, and on the release of the latch 88 the weight of the material in the receiver G causes the inner end of the closer-plate 80 to swing first to strike the toggle and oscillate the rocker $r$, after which the load-discharger as a whole will turn about the axis 82 to the position shown in Fig. 6. When the closer reaches said last-mentioned position, the material flowing therefrom oscillates the regulator to its working position and causes the closing of the circuit at the contacts 89 and 90 and the consequent energization of the electromagnet $m$ to latch the detent 91 over the end of the rocker-arm 86 to hold the load-discharger in its wide-open position until all of the material of the discharged load shall have passed by the regulator.

As soon as the first part of the load is discharged the load-discharger of course rises, and when it reaches its uppermost position the arm 95, striking the arm 52 of the circuit-controller $c$, shifts the latter to break the circuit at $52''$ and 53. At this time all of the circuits to the solenoids and to the electromagnet $m'$ are open and will remain open until the regulator returns to its normal position, whereupon the latch 91 will be released and the load-discharger closing will cause the arm 85 of the rocker to close the circuit to the solenoid S, controlled by the contact-arms 42 and 43, whereupon all of the several parts will be in position for a new cycle of operations.

Having described my invention, I claim—

1. In an automatic weighing-machine, the combination, with a hydraulically-balanced load-receiver, of stream-supplying means; stream-controlling means; and a hydraulic controller governed by the movements of the load-receiver and controlling the movement of the stream-controlling means.

2. In a weighing-machine, the combination, with a hydraulically-balanced load-receiver, of stream-supplying means; stream-controlling means; and hydraulic controlling means governed by the movements of the load-receiver and controlling the movements of different members of the weighing-machine.

3. In a weighing-machine, the combination, with a hydraulically-balanced load-receiver having a member shiftable for discharging a load, of stream-supplying means; stream-controlling means; and hydraulic controlling means governed by the load-receiver and controlling the movements of the stream - controlling means and the shiftable member of the load-receiver.

4. In a weighing-machine, the combination, with a hydraulically-balanced load-receiver and with a load-discharger, of stream-supplying means; stream-controlling means; and hydraulic controlling means governed by the load-receiver and controlling the movements of the stream-controlling means and the load-discharger.

5. In a weighing-machine, the combination, with a hydraulically-balanced load-receiver, of stream-supplying means; stream-controlling means; a closed casing; and a hydraulic controller movable in said casing and governed by the movements of the load-receiver and controlling one of the movable members of the weighing-machine.

6. In an automatic weighing-machine, the combination, with a load-receiver, of a single counterpoised oscillatory load-discharger having two parallel axes of movement, and connections between the load-receiver and load-discharger to points at different distances from one of the axes of movement of the latter.

7. In an automatic weighing-machine, the combination, with a load-receiver, of a single counterpoised oscillatory load-discharger embodying two members, one carried by the other and having parallel axes of movement, and connections between the load-receiver and the load-discharger to points at different distances from one of the axes of movement of the latter.

8. In an automatic weighing-machine, the combination, with a load-receiver, of a single counterpoised oscillatory load-discharger embodying a counterweighted rock-frame and a closer pivotally carried by the rock-arms of said rock-frame, and connections between the load-receiver and load-discharger to points at different distances from the axis of oscillation of the rock-frame.

9. In a weighing-machine, the combination, with a load-receiver, of a single counterpoised oscillatory load-discharger having two parallel axes of movement; a rocker mounted for oscillation on said load-receiver; and a pair of connectors joined to the load-discharger at different distances from one of the axes of movement of the latter, and connected to the rocker in different angular positions with respect to the axis of the latter.

10. In a weighing-machine, the combination, with a load-receiver, of a single counterpoised oscillatory load-discharger having two parallel axes of movement; a rocker mounted for oscillation on said load-receiver; and a pair of connectors joined to the load-discharger at different distances from one of the axes of movement of the latter and connected to the rocker at different distances from the axis of the latter and in different angular positions with respect to such axis.

11. In a weighing-machine, the combination, with a load-receiver, of a counterpoised oscillatory load-discharger having two parallel axes of movement; a rocker mounted for oscillation on said load-receiver; a connecting-rod pivoted to the load-discharger near the free end of the latter and pivoted to the rocker at a point which is substantially in the dead-center line of the latter when the load-discharger is closed; and a second connecting-rod pivoted to the load-discharger near the axis of movement thereof and pivoted to the rocker at a point which is substantially in the line of maximum leverage of the latter when the load-discharger is closed.

12. In a weighing-machine, the combination, with a load-receiver, of a single counterpoised oscillatory load-discharger having two parallel axes of movement; a rocker mounted for oscillation on said load-receiver; a pair of connecting-rods joined to the load-discharger at different distances from one of the axes of movement of the latter and connected to the rocker in different angular positions with respect to the axis of the latter; and a pair of alternately-operative holding devices for engaging the rocker at different points thereof to hold the load-discharger in its respective open and closed positions.

13. In a weighing-machine, the combination, with a support, of overloading means; a load-receiver; shiftable load-reducing means carried by said load-receiver and in position to receive material directly from the overloading means; a fixed cut-off plate on the load-receiver and controlling the discharge end of the load-reducing means; and a surplus-receiver on the support.

14. In a weighing-machine, the combination, with a support, of overloading means; a load-receiver; an oscillatory load-reducing spout carried by said load-receiver and in position to receive material directly from the overloading means; a fixed cut-off plate on the load-receiver and embodying a cut-off member controlling the discharge end of the load-reducing spout, and also having an inclined surplus-deflector; and a surplus-receiver on the support.

15. In a weighing-machine, the combination, with a support, of an overloading-spout; a load-receiver; shiftable load-reducing means carried by said load-receiver and in position to receive material directly from the overloading-spout; a fixed cut-off plate on the load-receiver and controlling the discharge end of the load-reducing means; a surplus-receiving reconveying-spout on the support; and a pair of valves connected for movement in unison and controlling, respectively, the overloading-spout and the surplus-receiving reconveying-spout.

16. In a weighing-machine, the combination, with stream-supplying means and with stream-controlling means, of a load-receiver embodying a member shiftable for discharging a load; a regulator; electrically-controlled holding means for holding said shiftable member in its open position; and an automatic electrical circuit-controller governed by the regulator for releasing said holding means on the return of the regulator to its normal position.

17. In a weighing-machine, the combination, with stream-supplying means and with stream-controlling means, of a load-receiver; a load-discharger; a regulator; an electrically-controlled latch for latching said load-discharger in its open position; and an automatic electrical circuit-controller governed by the regulator for releasing said latch on the return of the regulator to its normal position.

18. In a weighing-machine, the combination, with stream-supplying means and with stream-controlling means, of a hydraulically-balanced load-receiver, and a hydraulically-operated electrical circuit-controller governed by the movements of the load-receiver.

19. In a weighing-machine, the combination, with stream-supplying means and with stream-controlling means, of a hydraulically-balanced load-receiver; and a hydraulically-operated electrical circuit-controller governed by the movements of the load-receiver and controlling the operation of a movable member of the weighing-machine.

20. In a weighing-machine, the combination, with stream-supplying means and with stream-controlling means, of a vertically-movable hydraulically-balanced load-receiver embodying a member shiftable for discharging a load, and hydraulically-operated electrical circuit-controlling means governed by the vertical movements of the load-receiver and controlling the operation of the stream-controlling means and the shiftable member of the load-receiver.

21. In a weighing-machine, the combination, with stream-supplying means and with stream-controlling means, of a vertically-movable hydraulically-balanced load-receiver; an oscillatory load-discharger carried by the load-receiver; and hydraulically-operated electrical circuit-controlling means governed by the vertical movements of the load-receiver, and controlling the operation of the stream-controlling means and the load-discharger.

22. In a weighing-machine, the combination, with stream-supplying means and with stream-controlling means, of a vertically-movable hydraulically-balanced load-receiver embodying a member shiftable for discharging a load; a hydraulically-operated electrical circuit-controller governed by the vertical movements of the load-receiver; and an automatic electrical circuit-controller governed by the movements of said shiftable member of the load-receiver, and included in a single circuit with the hydraulically-operated circuit-controller, and controlling conjointly therewith the operation of the stream-controlling means.

23. In a weighing-machine, the combination, with a vertically-movable load-receiver, of overloading means; an oscillatory load-reducing member shiftable to opposite sides of a normal, central, closed position; a pair of solenoids for shifting said load-reducing member to opposite sides of such central position; and a pair of automatic electrical circuit-controllers governed by the movements of the load-receiver and controlling said respective solenoids.

FRANCIS H. RICHARDS.

Witnesses:
F. N. CHASE,
FRED. J. DOLE.